United States Patent [19]
Stephenson, III

[11] Patent Number: 5,392,090
[45] Date of Patent: Feb. 21, 1995

[54] BOUNCE FLASH APPARATUS USABLE WITH A PHOTOGRAPHIC CAMERA

[75] Inventor: Stanley W. Stephenson, III, Spencerport, N.Y.

[73] Assignee: Eastman Kodak Company, Rochester, N.Y.

[21] Appl. No.: 126,618

[22] Filed: Sep. 24, 1993

[51] Int. Cl.⁶ .............................................. G03B 15/03
[52] U.S. Cl. .................................................. 354/415
[58] Field of Search ............ 354/413, 415, 132, 149.1, 354/149.11, 127.1

[56] References Cited
U.S. PATENT DOCUMENTS

| | | | |
|---|---|---|---|
| 4,384,238 | 5/1983 | Greenwald | 354/132 X |
| 4,465,353 | 8/1984 | Yoshida et al. | 354/415 |
| 4,486,690 | 12/1984 | Takematsu | 354/415 X |
| 4,542,974 | 9/1985 | Yoshikawa et al. | 354/415 |
| 4,717,934 | 1/1988 | Kobayashi et al. | 354/415 |
| 5,136,312 | 8/1992 | Weaver et al. | 354/132 |

Primary Examiner—W. B. Perkey
Attorney, Agent, or Firm—David A. Howley

[57] ABSTRACT

A radiation source, inclined relative to an optical axis of a camera, is used for directing light towards a reflecting surface and thence towards a subject to be photographed. A sensor detects light from the radiation source which is reflected from the subject. A determination is made as to whether the intensity of light from the radiation source which is reflected from the subject is below a predetermined level. A light source is provided which is inclined substantially the same as the radiation source. The light source is utilized for visibly illuminating the subject by directing visible light towards the reflecting surface and thence towards the subject. When it is determined that the intensity of light from the radiation source which is reflected from the subject is below the predetermined level, an indication is provided to a camera operator that the light source cannot adequately illuminate the subject.

9 Claims, 2 Drawing Sheets

BOUNCE FLASH APPARATUS USABLE WITH A PHOTOGRAPHIC CAMERA

FIELD OF THE INVENTION

This invention relates generally to the field of photography, and more particularly to apparatus for visibly illuminating a subject to be photographed. Specifically, the invention relates to a bounce flash apparatus usable with a photographic camera.

BACKGROUND OF THE INVENTION

Current camera systems typically include an illuminating system for low light situations. The illuminator consists of a flash tube and reflector that are designed to illuminate the scene area captured by the camera on film. In these systems, a capacitor is charged from a battery to store a specific amount of energy. When the shutter of the camera is opened, the capacitor discharges through the flash tube to create a burst of light. It is desirable to limit the size of the camera, so the typical flash system has a maximum range of up to about 16 feet. Larger flash units exist that allow for illumination at greater distances and are typically provided as separate, large units.

One photographic technique that provides for improved image quality is the use of a reflecting surface to diffuse the flash and illuminate the subject off-axis from the light gathering (optical) axis of the camera. The simplest means for doing this is to use a white, reflective ceiling, and to direct the flash output in a bouncing configuration against the ceiling and then onto the subject to be photographed. This effect improves the image quality only when an appropriate reflecting surface is present and when the subject to be photographed is far enough away from the camera to prevent harsh facial shadows, but not so far away that the flash capacity cannot adequately illuminate the scene. In a bounce mode, the effective flash range is reduced by two stops, so bounce flash for a 12 foot flash range may be reduced to 8 feet or less. In addition, harsh shadows occur when the subject is closer than about 3 feet.

As a result, in a typical flash system, bounce flash will improve images when a ceiling is present and the subject to be photographed is between about 3 and 8 feet from the camera. This type of situation represents a significant portion of flash pictures. If the operator is aware of these operating parameters, a significant majority of captured indoor images can be accomplished with a bounce flash, resulting in improved image quality.

In U.S. Pat. No. 4,384,238, an illumination technique is disclosed in which two flashtubes 12 and 15, sharing a common capacitor, are built into a camera. Preferably flashtube 12, the bounce flashtube, is fired first. When a photosensor 18 senses that a predetermined fraction of a desired total amount of light has been reflected from the scene, flashtube 12 is quenched and the remaining energy in the capacitor is directed into flashtube 15 to directly illuminate the scene. If the camera is operated outdoors or in a room with a low-optically reflective ceiling, or if the distance between the camera and the subject is large, flashtube 12 is still fired (Col. 4, lines 26-39).

In U.S. Pat. No. 5,136,312, discloses a flash system wherein a source of flash illumination operates selectively in a first mode for projecting light in a first direction toward an indirect reflecting surface to illuminate a subject indirectly and in a second mode for projecting light in a second direction to illuminate a subject directly. Electromagnetic radiation reflected directly from the indirect reflecting surface is sensed directly to provide a signal containing information about the indirect reflecting surface. This information is used to control the selective projection of light in the first and second directions to control the quantities of indirect and direct light which illuminate the subject.

PROBLEMS TO BE SOLVED BY THE INVENTION

When an operator intends to use a bounce flash, the operator may not realize that an appropriate indirect reflecting surface is not present or that a subject to be photographed is either too close or too far from the camera. In this situation, the operator may wastefully fire the bounce flash which (a) drains the battery, (b) can reduce image quality because the operator thinks the scene will be illuminated with bounce flash and (c) diverts energy from the direct flash, if present, thereby reducing direct illumination of the scene to be photographed. This is exactly the situation in U.S. Pat. No. 4,384,238.

In order to use bounce flash there must be both an appropriate indirect reflecting surface present and the subject to be photographed must be a proper distance from the camera. The subject cannot be too close to or too far from the camera. In U.S. Pat. No. 5,136,312, the electromagnetic radiation (e.g. infrared) reflected from the indirect reflecting surface only contains information about the indirect reflecting surface, not the subject-to-camera distance. Although it is indicated that subject-to-camera distance provided by an auto-ranging system may be used to determine whether or not to fire the indirect flash, this adds to the complexity and cost of the system. Using an auto-ranging system also requires that two electromagnetic radiation sources, two sensors and more complex logic and control are needed to determine whether or not to use the bounce flash to illuminate a subject.

SUMMARY OF THE INVENTION

The present invention includes a radiation source, inclined relative to an optical axis of a camera, for directing light towards a reflecting surface and thence towards a subject to be photographed. A sensor detects light from the radiation source which is reflected from the subject. A determination is made as to whether the intensity of light from the radiation source which is reflected from the subject is below a predetermined level. A light source is provided which is inclined substantially the same as the radiation source. The light source is utilized for visibly illuminating the subject by directing visible light towards the reflecting surface and thence towards the subject. When it is determined that the intensity of light from the radiation source which is reflected from the subject is below the predetermined level, an indication is provided to a camera operator that the light source cannot adequately illuminate the subject.

ADVANTAGEOUS EFFECT OF THE INVENTION

The present invention automatically determines when an appropriate indirect reflecting surface is present and a subject to be photographed is a proper distance from the camera. This determination is accomplished with a single radiation source and a single sensor, thereby reducing the complexity and cost of the system.

By providing an indication to the operator when it is not appropriate to use bounce flash, the operator will be able to enhance the quality of images captured by the camera. The operator also will not wastefully fire the bounce flash, thereby saving battery energy and allowing the full energy in a single capacitor illumination system to be directed to the direct flash, further enhancing image quality.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
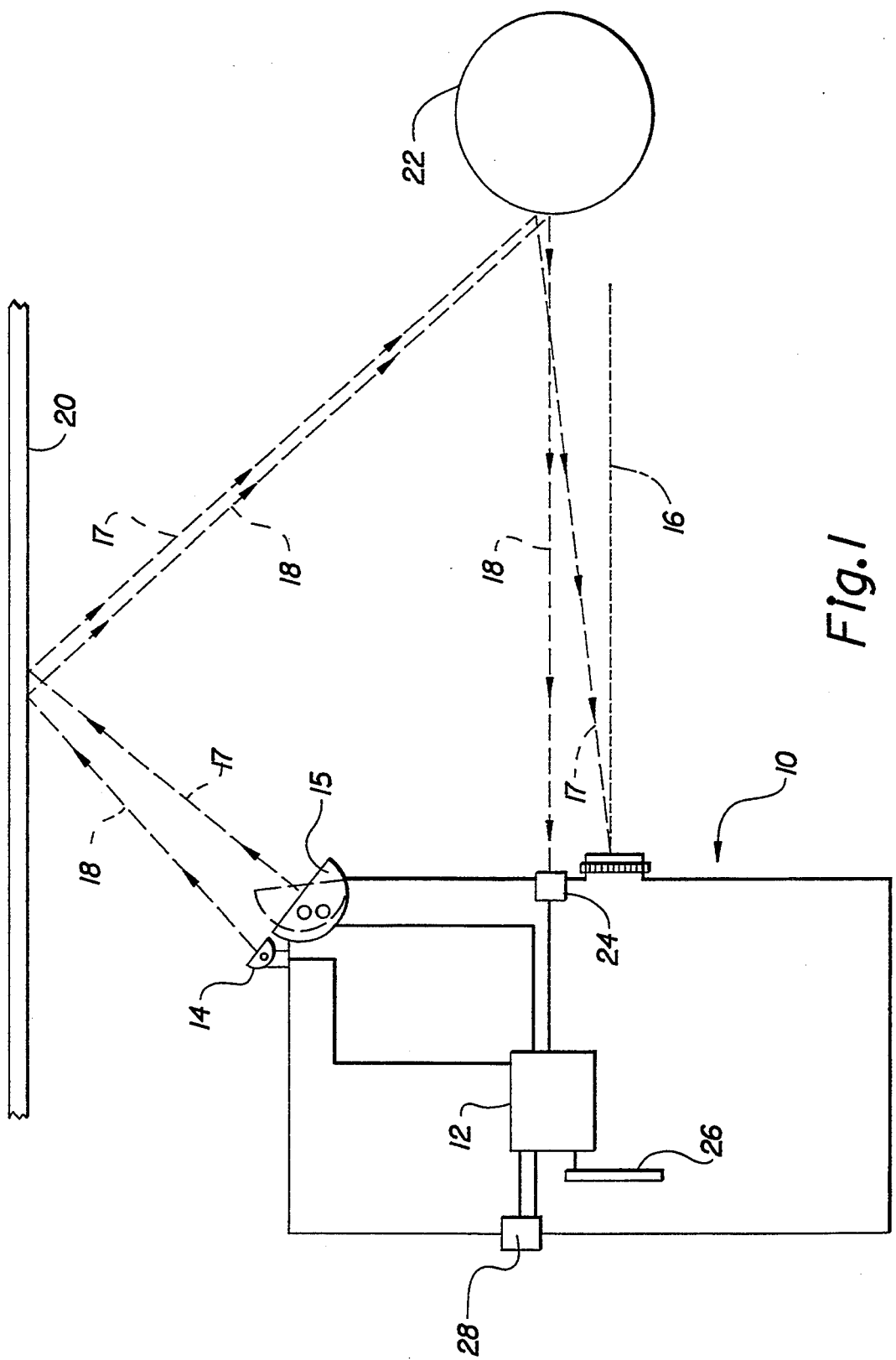
FIG. 1 is a schematic illustration of a camera incorporating a bounce flash.

Referring now to the drawings, FIG. 1 shows a camera designated generally by the reference numeral 10. Camera 10 includes logic and control 12 which controls various functions of the camera. A radiation source 14 is located on top of camera 10. Radiation source 14 emits light which is used to determine whether or not appropriate bounce flash conditions are present. A light source 15 (bounce flash), for visibly illuminating a subject to be photographed, is also located on top of the camera. Light source 15 emits light along a path 17. This light reflects off reflecting surface 20 and subject 22 towards camera 10, thereby illuminating subject 22 for photographing.

Light source 15 and radiation source 14 are inclined substantially the same, relative to an optical axis 16 of camera 10, at an optimal angle for bounce flash illumination. Light source 15 can be moved by the operator between a detented direct flash position, shown in phantom and a detented bounce flash position shown in solid lines.

Light emitted from radiation source 14 travels along a path 18 and is reflected off a reflecting surface 20. The light reflected from reflecting surface 20 is then reflected off a subject to be photographed 22 towards a sensor 24. When both an appropriate reflecting surface (i.e. a reflecting surface of proper reflectance, shape and distance from the camera) and a proper camera to subject distance (e.g. between about 3–8 feet) are present, sensor 24 will receive light emitted from radiation source 14. If either an inappropriate reflecting surface or an improper camera to subject distance are present, sensor 24 will receive little or no light from radiation source 14.

Light emitted from radiation source 14 may be significantly attenuated by the time it reaches sensor 24, and various forms of background radiation may be present. Consequently, it is preferable for radiation source 14 to emit light at an uncommon frequency. Radiation source 14 preferably includes a high output, narrow focus light emitting diode (LED) which emits near infra-red or red light. Because LED units emit light at a very specific frequency, versus the broad spectrum from a flash tube, energy requirements for bounce sensing are reduced. As a result, power switching requirements for the emitter driver are lowered.

Sensor 24 should be filtered to be most sensitive to (a) the light emitted from radiation source 14 and (b) conditioning electronics (not shown) disposed to detect the frequency of light emitted. The light output from radiation source 14 and sensor 14 should be balanced so that light emitted from radiation source 14 is detected by sensor 24 only if both an appropriate reflecting surface and a proper subject to camera distance are present.

Logic and control 12 determines whether the intensity of light detected by sensor 24 is below a predetermined level. If the intensity of light detected by sensor 24 is below a predetermined level, logic and control 24 provides an indication to a camera operator that light source 15 cannot adequately illuminate subject 22. This indication can assume a number of forms. For example, logic and control 12 can disable light source 15 from illuminating subject 22. Logic and control 12 can also disable camera 10 from photographing subject 22 by, for example, preventing a shutter 26 from opening. Further, a bounce flash indicator 28 can provide an audio and/or visual signal to the operator.

When the intensity of light detected by sensor 24 is at or above a predetermined level, logic and control 12 provides an indication to a camera operator that light source 15 can adequately illuminate subject 22. This indication can assume a number of forms. For example, logic and control 12 can enable light source 15 to illuminate subject 22. Logic and control 12 can also enable camera 10 from photographing subject 22 by, for example, allowing a shutter 26 to open. Further, a bounce flash indicator 28 can provide an audio and/or visual signal to the operator.

Figure 2:
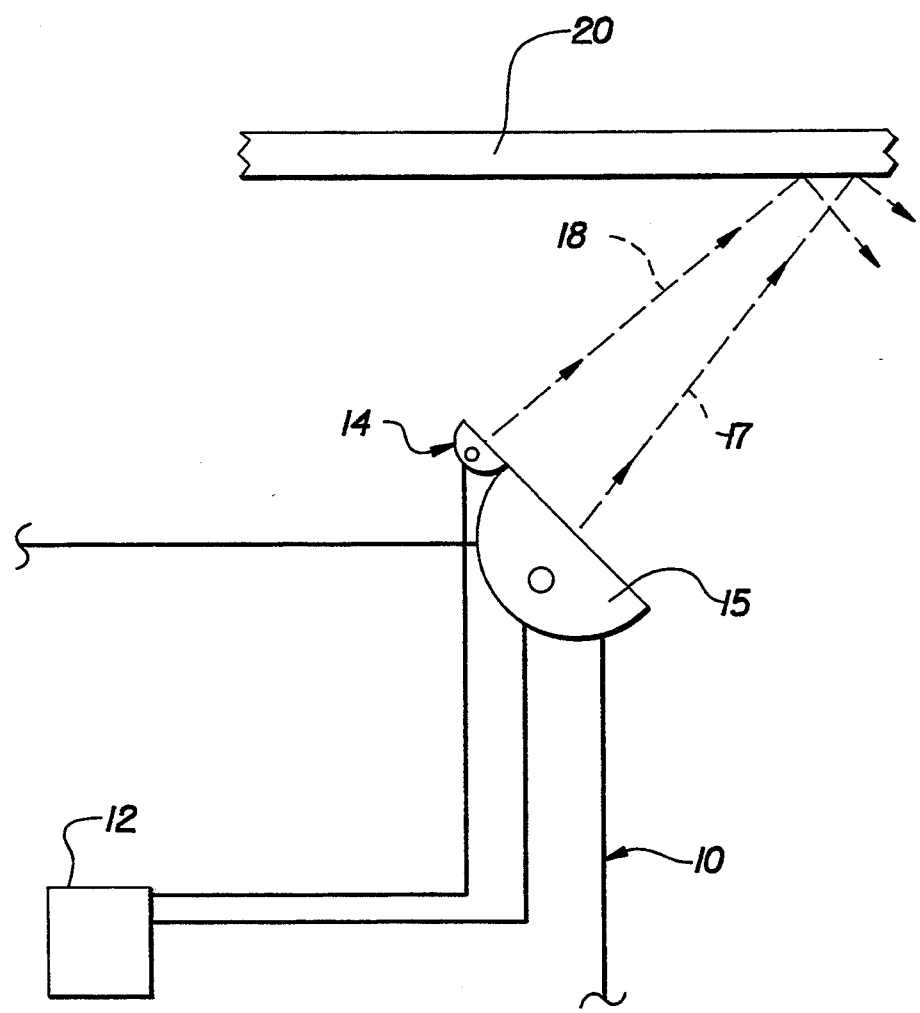
FIG. 2 is an alternative embodiment of a bounce flash apparatus.

Turning now to FIG. 2, an alternative embodiment of a bounce flash apparatus is disclosed. In this embodiment, radiation source 14 is secured to light source 15 such that radiation source 14 and light source 15 are always inclined by the same amount relative to the camera's optical axis. As radiation source 14 emits light, the operator or a motor drive moves light source 15. When sensor 24 receives the maximum light from radiation source 14, the optimum angle for bounce flash has been obtained. At this point an operator receives an indication that the best bounce flash position has been reached and the operator stops moving the light source 15. If a motor drive is used to move the light flash, the motor drive is stopped when the best bounce flash position is reached.

The invention has been described with reference to a preferred embodiment. However, it will be appreciated that variations and modifications can be effected by a person of ordinary skill in the art without departing from the scope of the invention.

PARTS LIST FOR FIGS. 1-2

10 Camera
12 Logic and Control
14 Radiation Source
15 Light Source
16 Optical Axis
17 Light Path
18 Light Path
20 Reflecting Surface 22 Subject
24 Sensor
26 Shutter
28 Bounce Flash Indicator

What is claimed is:

1. A bounce flash apparatus usable with a photographic camera, comprising:
   a light emitting diode (LED) inclined relative to an optical axis of said camera for directing light towards a reflecting surface and thence towards a subject to be photographed;
   a sensor for detecting light from said LED which is reflected from said subject;
   control means coupled to said sensor for determining whether the intensity of light from said LED which is reflected from said subject is below a predetermined level;
   a light source inclined substantially the same as said LED for visibly illuminating said subject by directing visible light towards said reflecting surface and thence towards said subject; and
   means, responsive to said control means determining that the intensity of light from said LED which is reflected from said subject is below said predetermined level, for indicating to a camera operator that said light source cannot adequately illuminate said subject.

2. The bounce flash apparatus of claim 1 wherein said indicating means includes means for disabling said light source from visibly illuminating said subject when the intensity of light from said LED which is reflected from said subject is below said predetermined level.

3. The bounce flash apparatus of claim 1 wherein said indicating means includes means for disabling said camera from photographing said subject when the intensity of light from said LED which is reflected from said subject is below said predetermined level.

4. The bounce flash apparatus of claim 1, further comprising:
   means, responsive to said control means determining that the intensity of light from said LED which is reflected from said subject is above said predetermined level, for informing a camera operator that said light source can adequately illuminate said subject.

5. The bounce flash apparatus of claim 4 wherein said informing means includes means for enabling said light source for visibly illuminating said subject when the intensity of light from said LED which is reflected from said subject is above said predetermined level.

6. The bounce flash apparatus of claim 4 wherein said informing means includes means for enabling said camera to photograph said subject when the intensity of light from said LED which is reflected from said subject is above said predetermined level.

7. A bounce flash apparatus usable with a photographic camera, comprising:
   a light emitting diode (LED) inclined relative to an optical axis of said camera for directing light towards a reflecting surface and thence towards a subject to be photographed;
   a sensor for detecting light from said LED which is reflected from said subject;
   control means coupled to said sensor for determining whether the intensity of light from said LED which is reflected from said subject is above a predetermined level;
   a light source inclined substantially the same as said LED for visibly illuminating said subject by directing visible light towards said reflecting surface and thence towards said subject; and
   means, responsive to said control means determining that the intensity of light from said LED which is reflected from said subject is above said predetermined level, for informing a camera operator that said light source can adequately illuminate said subject.

8. The bounce flash apparatus of claim 7 wherein said informing means includes means for enabling said light source for visibly illuminating said subject when the intensity of light from said LED source which is reflected from said subject is above said predetermined level.

9. The bounce flash apparatus of claim 8 wherein said informing means includes means for enabling said camera to photograph said subject when the intensity of light from said LED which is reflected from said subject is above said predetermined level.

* * * * *

UNITED STATES PATENT AND TRADEMARK OFFICE
CERTIFICATE OF CORRECTION

PATENT NO. : 5,392,090
DATED : February 21, 1995
INVENTOR(S) : Stanley W. Stephenson, III, It is certified that error appears in the above-indentified patent and that said Letters Patent is hereby corrected as shown below:

Column 6, line 38, after LED delete "source".

Signed and Sealed this

Twenty-fifth Day of April, 1995

Attest:

BRUCE LEHMAN

*Attesting Officer*     *Commissioner of Patents and Trademarks*